(12) United States Patent
Suzuki (10) Patent No.: US 9,591,197 B2
(45) Date of Patent: Mar. 7, 2017

(54) LENS APPARATUS AND IMAGE PICKUP APPARATUS INCLUDING THE SAME

(71) Applicant: CANON KABUSHIKI KAISHA, Tokyo (JP)

(72) Inventor: Junichi Suzuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/962,090

(22) Filed: Dec. 8, 2015

(65) Prior Publication Data

US 2016/0182810 A1    Jun. 23, 2016

(30) Foreign Application Priority Data

Dec. 19, 2014  (JP) ................................. 2014-257618

(51) Int. Cl.
*H04N 5/232*   (2006.01)
*G03B 3/10*    (2006.01)
*G02B 7/09*    (2006.01)
*G02B 15/10*   (2006.01)

(52) U.S. Cl.
CPC ............... *H04N 5/232* (2013.01); *G02B 7/09* (2013.01); *G02B 15/10* (2013.01); *G03B 3/10* (2013.01)

(58) Field of Classification Search
CPC ... G02B 7/04; G02B 7/08; G02B 7/09; G02B 7/102; G03B 3/10; G03B 13/32–13/36; H04N 5/23212; H04N 5/232; H04N 5/23296
See application file for complete search history.

(56) References Cited

U.S. PATENT DOCUMENTS

| 2011/0158627 A1* | 6/2011 | Hirai | G03B 13/36 396/137 |
| 2011/0243540 A1* | 10/2011 | Kato | G02B 7/08 396/99 |

FOREIGN PATENT DOCUMENTS

JP          3777502 B2      5/2006

\* cited by examiner

*Primary Examiner* — Paul Berardesca
(74) *Attorney, Agent, or Firm* — Rossi, Kimms & McDowell LLP (57) ABSTRACT

A lens apparatus includes: a movable optical member; a driving unit that drives the movable optical member; an operating unit that operates the driving unit; a first controller that derives an input value for operating the driving unit based on an operation amount of the operating unit; a second controller that corrects the input value input from the first controller to calculate a control value and outputs the control value to the driving unit; and a deriving unit that derives a matching position from the control value. When an operation from the operating unit becomes effective, the deriving unit outputs the matching position to the first controller, and the first controller sets the matching position to the input value.

9 Claims, 8 Drawing Sheets

LENS APPARATUS AND IMAGE PICKUP APPARATUS INCLUDING THE SAME

BACKGROUND OF THE INVENTION

Field of the Invention

The present invention relates to a lens apparatus, and particularly to a lens apparatus for use in television photographing, cinematography, and the like, including an endless operating unit, and to an image pickup apparatus including the lens apparatus.

Description of the Related Art

It is generally known that a television lens (hereinafter referred to as a lens apparatus) for use in television photographing operates a driving target such as a stop (hereinafter referred to as an iris), a zoom lens, or a focus lens, based on an instruction from a camera connected to the lens by using various operating apparatuses.

Figure 9:
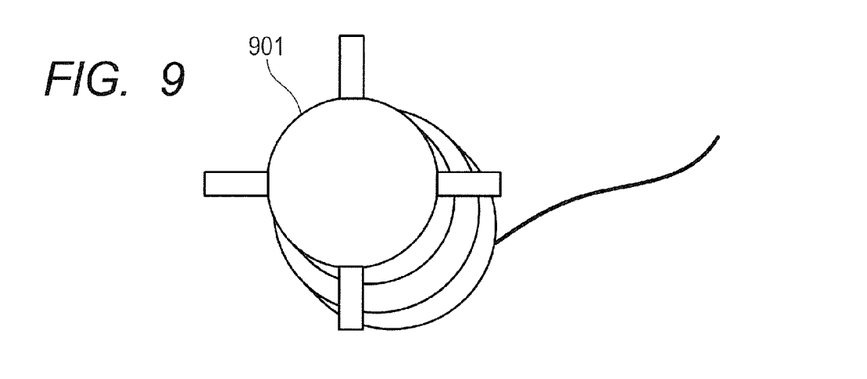
FIG. 9 schematically illustrates an operating apparatus.

An operating apparatus illustrated in FIG. 9 is connected to a lens apparatus for communication and transmits position information in accordance with a rotation position of an operating unit 901 to the lens apparatus as an instructed position, thereby enabling control of the position of a driving target of the lens apparatus.

The operating apparatus includes a non-endless operating apparatus in which an operating unit has a limited rotation angle range and an endless operating apparatus in which an operating unit has a non-limited rotation angle range. In the case of the non-endless operating apparatus, position information proportional to the rotation position of the operating unit is used as an instructed position. Thus, when an operation right is switched to the operating apparatus from another operation source such as a camera, if the position of the driving target at this time does not correspond to the rotation position of the operating unit, the driving target moves to a position corresponding to the rotation position of the operating unit disadvantageously. For example, when the operation right is switched to an operating apparatus after the focus lens has been driven by using an autofocus function, a problem such as unintentional driving of the focus lens based on an instruction from the operating apparatus arises. In view of this, it is necessary to prevent lens driving that is not intended by a user in switching the operation right.

In a manner similar to the endless operating apparatus, for a conventional lens apparatus constituting an endless operating unit providing non-limited rotation, a technique for preventing lens driving that is not intended by a user in switching an operation right was disclosed.

For example, Japanese Patent No. 3777502 discloses a technique (hereinafter referred to as a matching technique) of matching a position of an endless operating unit with a lens position by using a final control value to be output to a driving unit (hereinafter referred to as a final control value) when an operation right is switched to an endless operating unit.

This technique will be described in detail below. First, a lens apparatus stores an instructed position (hereinafter referred to as an input control value) from an endless operating unit, and the value to be stored is updated upon the input control value changing. If the operation right is switched to the endless operating unit, a difference value between the final control value before switching of the operation right and the input control value is calculated from Equation (1):

$$\text{difference value} = \text{final control value (before switching)} - \text{input control value} \quad (1)$$

A final control value after switching of the operation right is calculated from Equation (2):

$$\text{final control value (after switching)} = \text{input control value} + \text{difference value} \quad (2)$$

Equation (1) and Equation (2) show that the final control value is uniform before and after switching the operation right.

In other words, the final control value before switching of the operation right is at a position at which matching is obtained (hereinafter referred to as a matching position), and matching is performed between the endless operating unit and the lens position by using the difference value. That is, unless neither the position of the endless operating unit nor the lens position changes between before and after switching of the operation right, movement of the lens position independent of operation of the endless operating unit does not occur in switching the operation right.

Figure 10A:
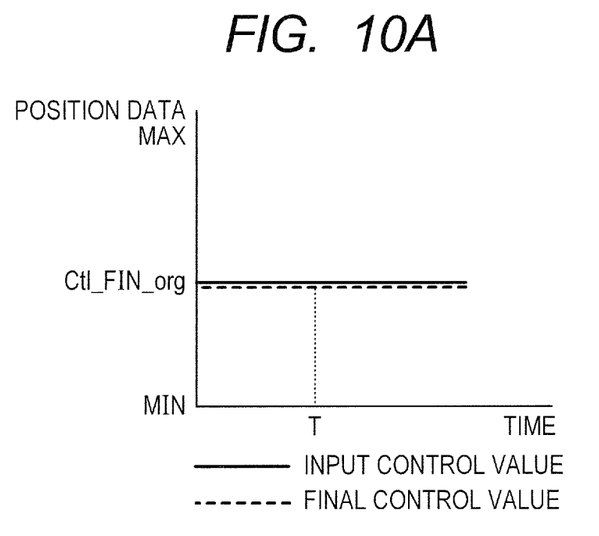
FIG. 10A is a graph showing a relationship between an input control value and a final control value in matching.

FIG. 10A shows a relationship between the input control value and the final control value in a case where the operation right is switched to the endless operating unit at time T. In the case where the operation right is switched to the endless operating unit, the position of the lens apparatus and the position of the endless operating unit are matched so that unintentional lens driving can be prevented in switching the operation right.

In the known technique disclosed in Japanese Patent No. 3777502 described above, however, the lens is unintentionally driven when a final control value is calculated by correcting an input control value for the purpose of operation except matching. For example, in the case of calculating a final control value from Equation (3):

$$\text{final control value (before switching)} = \text{input control value (before switching)} + \text{correction value } \alpha \quad (3)$$

the difference value described above can be obtained from Equation (4):

$$\text{difference value} = \text{final control value (before switching)} - \text{correction value } \alpha - \text{input control value} \quad (4)$$

The obtained difference value is substituted into Equation (2), and a final control value after switching the operation right is obtained from Equation (5):

$$\text{final control value (after switching)} = \text{final control value (before switching)} - \text{correction value } \alpha \quad (5)$$

As shown in the above description, a difference corresponding to the correction value $\alpha$ occurs in the final control value before and after switching of the operation right.

Figure 10B:
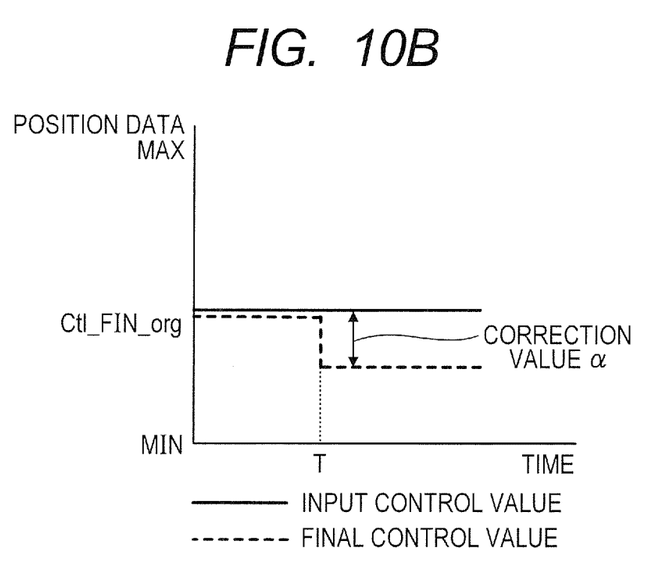
FIG. 10B is a graph showing a relationship between the input control value and the final control value in matching.

FIG. 10B shows a relationship between the input control value and the final control value in a case where the operation right is switched to the endless operating unit at time T in calculating the final control value from Equation (3). In the case of calculating the final control value by correcting the input control value, if a position at which matching is obtained (hereinafter referred to as a matching position) is defined as the final control value, the lens is unintentionally driven to a degree corresponding to the correction value $\alpha$ only by switching the operation right.

As described above, in the known technique described above, the case of calculating the final control value by correcting the input control value has a problem in which merely switching the operation right causes a lens driving that is not intended by a user. In the case of using the endless operating apparatus described above, a similar problem arises.

In a correction process of calculating the final control value by performing correction, whether the correction process is performed or not depends on conditions of the lens apparatus, and thus, merely performing addition or subtraction of the correction value causes a problem of unintentional movement of the lens.

SUMMARY OF THE INVENTION

In view of the above, the present invention provides a lens apparatus that can prevent unintentional lens driving occurring in switching an operation right by correcting a matching position by computation in accordance with conditions of a lens.

A lens apparatus according to the present invention is characterized by including: a movable optical member; a driving unit that drives the movable optical member; an operating unit that operates the driving unit; a first controller that derives an input value for operating the driving unit based on an operation amount of the operating unit; a second controller that corrects the input value input from the first controller to calculate a control value and outputs the control value to the driving unit; and a deriving unit that derives a matching position from the control value, wherein when an operation from the operating unit becomes effective, the deriving unit outputs the matching position to the first controller, and the first controller sets the matching position to the input value.

The present invention can provide a lens apparatus that corrects a matching position by computation in accordance with conditions of a lens so as to prevent unintentional lens driving in switching an operation right.

Further features of the present invention will become apparent from the following description of exemplary embodiments with reference to the attached drawings.

DESCRIPTION OF THE EMBODIMENTS

Figure 1:
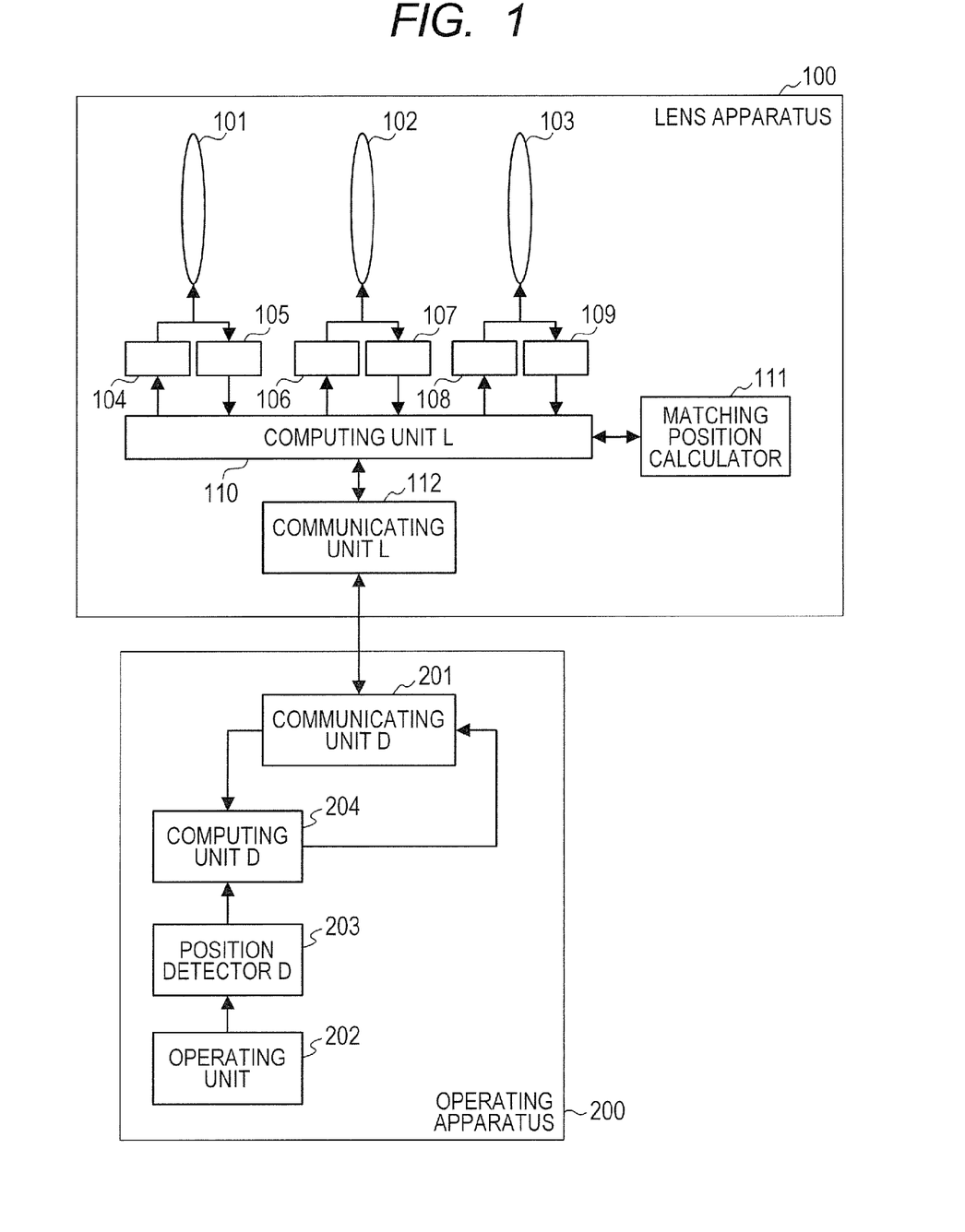
FIG. 1 is a block diagram illustrating a configuration according to a first embodiment.

Preferred embodiments of the present invention will now be described in detail in accordance with the accompanying drawings. FIG. 1 is a block diagram illustrating a configuration according to an embodiment of the present invention.

First Embodiment

Referring to FIGS. 1 to 8B, a lens apparatus according to a first embodiment of the present invention will be described.

FIG. 1 is a functional block diagram of a photographing system according to this embodiment. In FIG. 1, reference numeral 100 denotes a lens operating apparatus, and reference numeral 200 denotes an operating apparatus.

First, the lens apparatus 100 will be described.

The lens apparatus 100 includes a focus lens 101, a zoom lens 102, an iris 103, a computing unit L (second controller) 110, a matching position calculator (matching position deriver, deriving unit) 111, and a communicating unit L112.

The focus lens 101 is a lens that changes an object distance. The zoom lens 102 is a lens that changes a focal length. The iris 103 is a stop unit that adjusts the amount of light.

The focus lens 101 is connected to a focus driving unit 104 and a focus position detector 105. The zoom lens 102 is connected to a zoom driving unit 106 and a zoom position detector 107. The iris 103 is connected to an iris driving unit 108 and an iris position detector 109.

In accordance with driving of the focus lens 101, the focus position detector 105 outputs a position signal to the computing unit L110. Similarly, in accordance with driving of the zoom lens 102, the zoom position detector 107 outputs a position signal to the computing unit L (second controller) 110. In accordance with driving of the iris 103, the iris position detector 109 outputs a position signal to the computing unit L (second controller) 110.

The computing unit L110 outputs communication data to the communicating unit L112, and receives an instructed position from the communicating unit L112. The received instructed position (hereinafter referred to as an input control value, an input value) is subjected to various correction processes in accordance with conditions of the lens apparatus, thereby calculating (deriving) a control (hereinafter referred to as a final control value, a control value). Thereafter, a drive signal (hereinafter referred to as an output control value) is calculated (derived) by using a control parameter such as a gain with respect to the final control value, and the calculated output control value is output to the driving unit. For example, if the input control value is a focus instructed position, the focus lens 101 is driven by outputting an output control value for focusing calculated (derived) using a focus instructed position and a correction value related to the focusing to the focus driving unit 104. If the input control value is a zoom instructed position, the zoom lens 102 is driven by outputting an output control value for zooming to the zoom driving unit 106. Similarly, if the input control value is an iris instructed position, the iris 103 is driven by outputting the output control value of the iris to the iris driving unit 108. The various correction processes (hereinafter referred to as control correction processes) in accordance with conditions of the lens apparatus described above will be described in detail later.

In a case where the operation right is switched to the operating apparatus 200, a final control value and a correction value (hereinafter referred to as a control correction value) calculated (derived) in the control correction process are output to the matching position calculator 111, and a matching position input from the matching position calculator 111 is output to the communicating unit L112.

Based on the final control value and the control correction value input from the computing unit L110, the matching position calculator 111 calculates (derives) a matching position, and outputs the calculated matching position to the computing unit L110. A method for calculating the matching position will be described in detail later.

The communicating unit L112 transmits communication data input from the computing unit L110 to the operating apparatus 200, and outputs the instructed position received from the operating apparatus 200 to the computing unit L110.

Then, the operating apparatus 200 will be described.

The operating apparatus 200 mainly includes communicating unit D201, an operating unit (endless operating unit) 202, a position detector D203, and a computing unit D (first controller) 204.

The communicating unit D201 outputs communication data received from the lens apparatus 100 to the computing unit D204, and transmits an instructed position input from the computing unit D204 to the lens apparatus 100.

The operating unit 202 is an operating member operated by a user. In this embodiment, the operating unit 202 is a rotary operating member as illustrated in FIG. 9, and is an endless operating apparatus.

With rotational movement of the operating member, the position detector D203 outputs a position signal to the computing unit D204.

Based on the communication data input from the communicating unit D201 and the position signal (operation amount, rotation amount) input from the position detector D203, the computing unit D204 calculates (derives) an instructed position, and outputs the calculated instructed position to the communicating unit D201. If the communication data input from the communicating unit D201 is a matching position, the matching position is output to the communicating unit D201 as the instructed position.

In this embodiment, the instructed position transmitted from the operating apparatus 200 to the lens apparatus 100 is a focus instructed position.

Thereafter, a control correction process performed in accordance with conditions of the lens apparatus will be described.

The lens apparatus performs various control correction processes in order to enhance control performance in some cases. For example, an integration process for calculating a final control value (control value) is performed in some cases by using an input control value (input value) and a control correction value calculated from Equation (6):

$$\text{control correction value } \alpha = \int (\text{lens position} - \text{input control value}) dt \quad (6)$$

As shown in Equation (6), the control correction value $\alpha$ in the integration process is a value obtained by integrating a difference between the lens position and the input control value with respect to time. In the integration process, the control correction value $\alpha$ is continuously added to the input control value. For example, in a case where the optical axis direction that is a moving direction of the lens is not horizontal, and the lens is subjected to a force in one moving direction under its own weight, the lens position can be moved closer to the input control value by performing the integration process.

In this embodiment, a matching position deriving method in the case of performing the control correction process will be described. In this embodiment, it is assumed that the control correction process is performed by the computing unit L110, and a control correction process is performed by using the integration process.

Referring now to FIGS. 2, 3A, 3B, and 3C, a deriving method for deriving an output control value in the case of performing the control correction process will be described.

Figure 2:
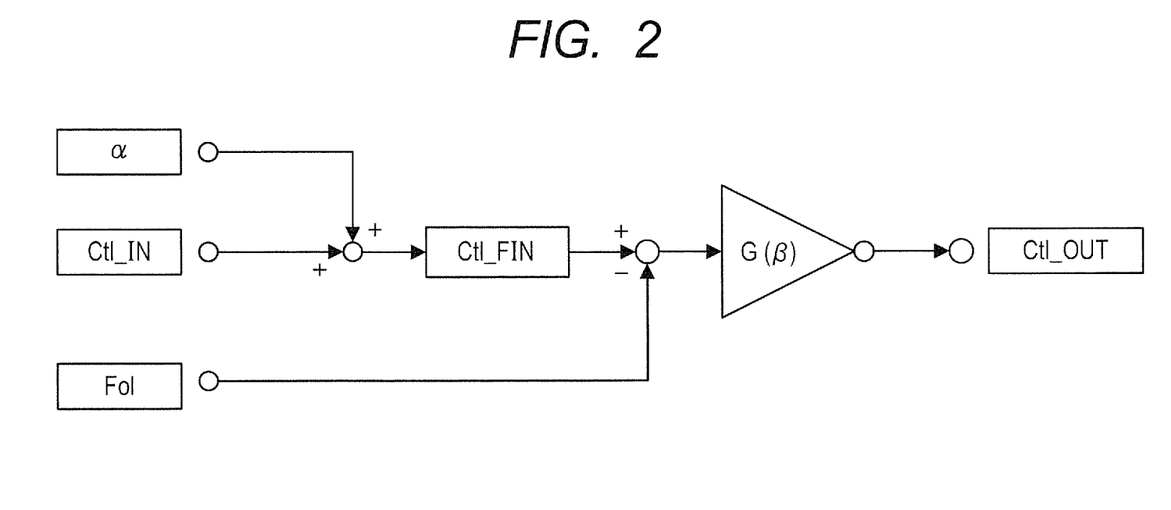
FIG. 2 is a control diagram in calculating a final control value according to the first embodiment.

First, FIG. 2 is a control diagram in calculating (deriving) an output control value performed by the computing unit L110. In the control correction process, a final control value is obtained from Equation (7):

$$\text{final control value (Ctl\_FIN)} = (\text{input control value (Ctl\_IN)} + \text{control correction value } (\alpha)) \quad (7)$$

Using the final control value, an output control value is obtained from Equation (8)

$$\text{output control value (Ctl\_OUT)} = (\text{final control value (Ctl\_FIN)} = \text{lens position } (Fol)) \times \text{control parameter } (\beta) \quad (8)$$

Figure 3A:
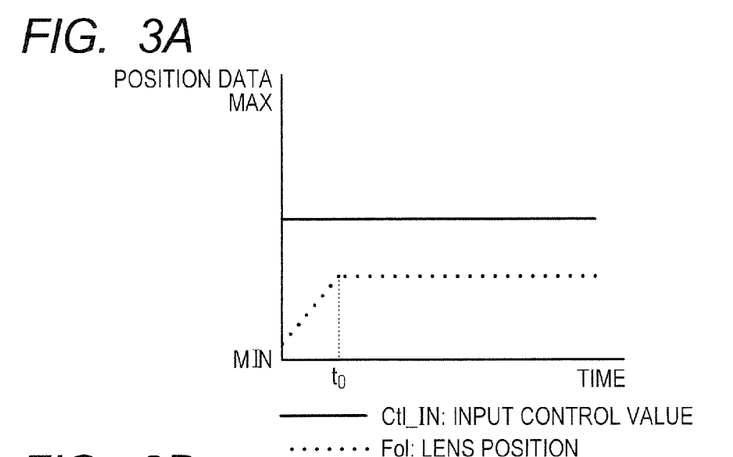
FIG. 3A is a graph showing a relationship among an input control value, a final control value, and a lens position.
Figure 3B:
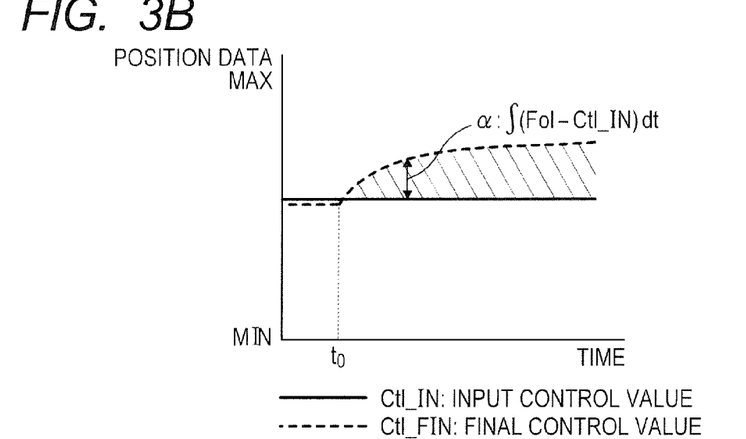
FIG. 3B is a graph showing a relationship among the input control value, the final control value, and the lens position.
Figure 3C:
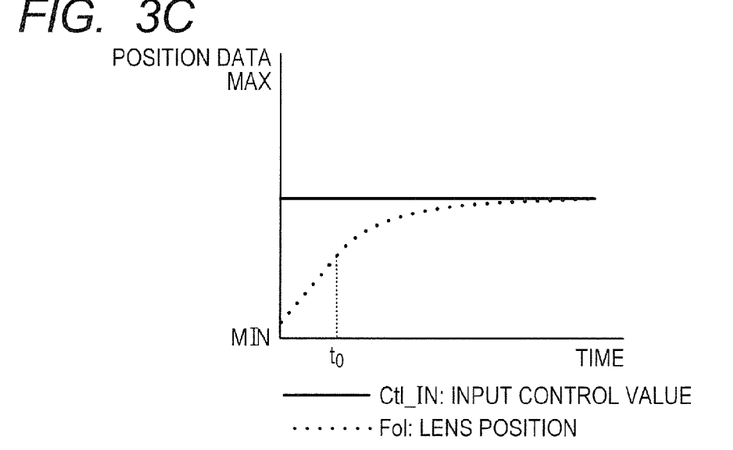
FIG. 3C is a graph showing a relationship among the input control value, the final control value, and the lens position.

FIGS. 3A, 3B, and 3C illustrate relationships among the input control value, the final control value, and the lens position.

First, FIG. 3A will be described. FIG. 3A shows a relationship between the input control value and the lens position in the case of performing no integration process. FIG. 3A demonstrates that the lens position is separated from the input control value. As described above, this relationship is established in the case where the lens apparatus is disposed in a tilted orientation so that the moving direction of the lens is not horizontal and the lens is subjected to a force in one moving direction under its own weight.

FIG. 3B illustrates a relationship between the input control value and the final control value in the case of performing the integration process from time $T_0$. The hatched portion in the graph indicates the control correction value $\alpha$ calculated (derived) from Equation (6). As described with reference to FIG. 2, the value calculated (derived) from Equation (7) is the final control value. In application, a value obtained by multiplying the final control value by a control parameter such as a gain is output as an output control value to the driving unit.

FIG. 3C illustrates a relationship between the input control value and the lens position in the case of performing the integration process. As compared to FIG. 3A, the lens position can be moved closer to the input control value by performing the integration process.

In this embodiment, when the focus instructed position is input to the computing unit L110 from the communicating unit L112, the computing unit L110 calculates a control correction value $\alpha$ through the integration process. Thereafter, the input control value and the control correction value $\alpha$ are substituted into Equation. (7), thereby calculating a final control value for focusing. The final control value for focusing obtained from Equation (7), a focus control gain value $\beta$, and a focus lens position are substituted into Equation (8), thereby calculating an output control value for focusing.

Figure 4:
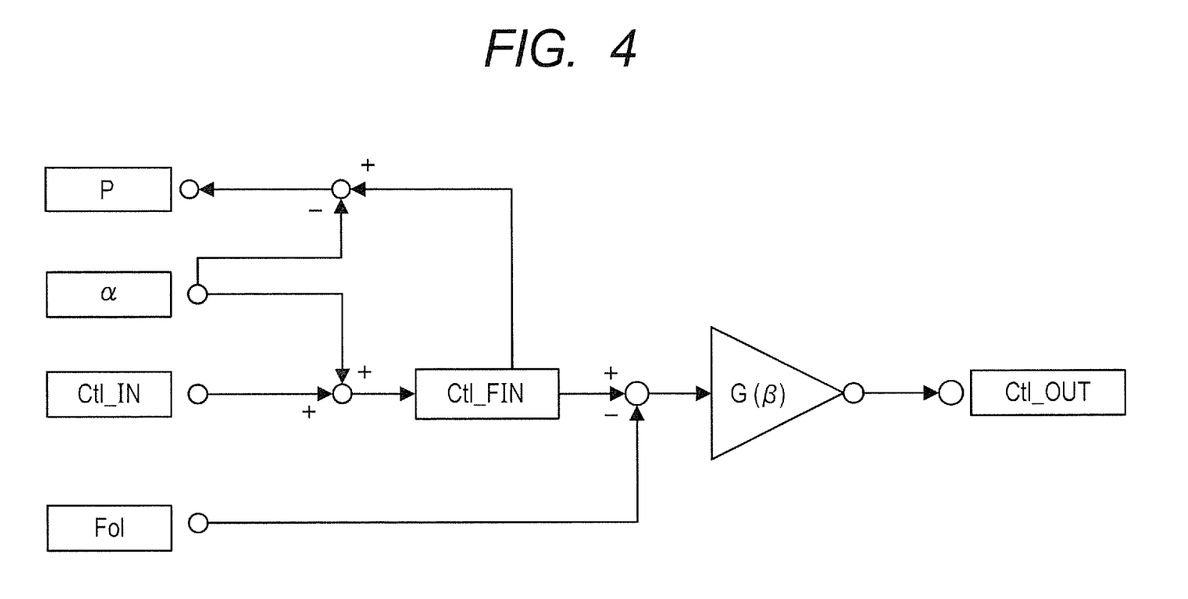
FIG. 4 is a control diagram in calculating a matching position according to the first embodiment.
Figure 5A:
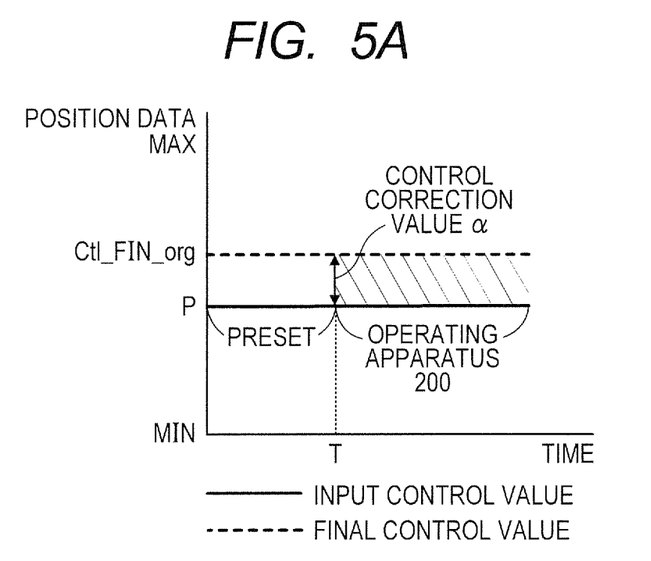
FIG. 5A is a graph showing a relationship among the input control value, the final control value, and the lens position in matching according to the first embodiment.
Figure 5B:
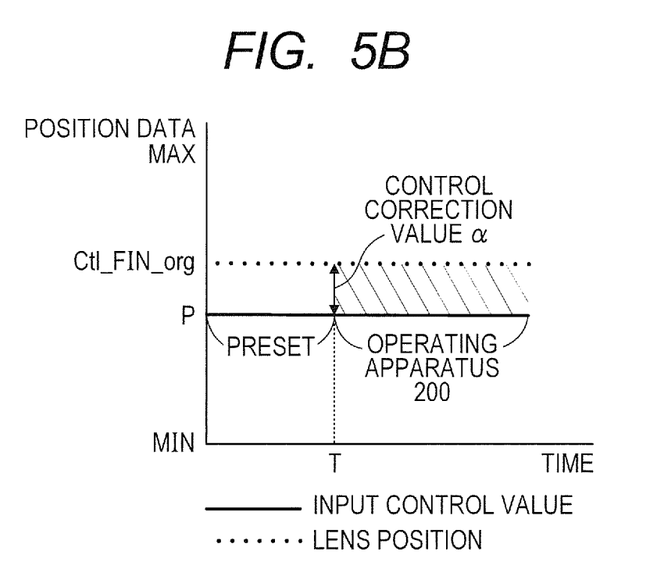
FIG. 5B is a graph showing a relationship among the input control value, the final control value, and the lens position in matching according to the first embodiment.

Referring now to FIGS. 4, 5A, and 5B, a matching position deriving process performed by the matching position calculator 112 will be described.

FIG. 4 is a control diagram in deriving a matching position in the case of performing the integration process. In the case of performing a control correction process such as the integration process, a matching position is obtained from Equation (9):

matching position (P)=final control value (Ctl_FIN)−control correction value (α)     (9)

In the case of performing no control correction process, the control correction value α is 0 (zero).

FIGS. 5A and 5B show relationships among the input control value, the final control value, and the lens position in the case of performing matching at time T. Hatched portions in the graphs indicate the control correction value α. The lens apparatus includes a preset operation of controlling the position to a previously stored position with an operation instruction from a switch or another device. For example, description will be given on a case where the operation right is switched from a focus position control by the preset operation to the operating apparatus 200 at time T. The final control value in this preset operation is Ctl_FIN_org.

FIG. 5A shows a relationship between the input control value and the final control value. When the operation right is switched from the focus position control by the preset operation to the operating apparatus 200 at time T, a matching process is executed, and a matching position P is calculated (derived) from Equation (9). The calculated matching position P is transmitted to the operating apparatus 200, and the operating apparatus 200 resets the input control value to the received matching position P so that the input control value output from the operating apparatus 200 to the lens apparatus 100 becomes P. That is, after time T, the input control value is P as long as the operating apparatus 200 is not operated. The final control value after time T is a value P+α to which the control correction value α is added in the integration process, with respect to the input control value P, and becomes equal to Ctl_FIN_org through Equation (9).

FIG. 5B illustrates a relationship between the input control value and the lens position. As described with reference to FIG. 5A, the final control value after matching becomes Ctl_FIN_org, and the final control value does not change before and after executing matching, and the lens position does not change, either, as shown in the graph. In the case of FIG. 10B in which the final control value is the matching position, unintentional driving of the lens occurs in switching the operation right. However, this problem can be solved by using the value obtained from Equation (9) as the matching position.

Figure 6:
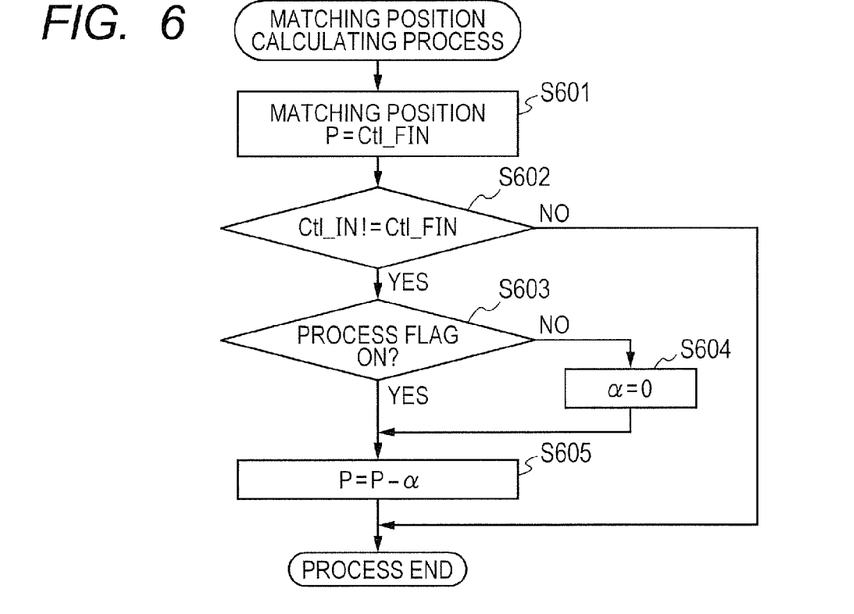
FIG. 6 is a flowchart of a matching position calculating process according to the first embodiment.

FIG. 6 is a flowchart showing a matching position deriving process in this embodiment.

First, at S601, the final control value Ctl_FIN is input from the computing unit L110 to the matching position calculator 111 and is set as a matching position P, and then, the process proceeds to S602.

In S602, it is determined whether the input control value Ctl_IN from the communicating unit L112 is mismatched with the final control value Ctl_FIN or not. If these values are mismatched, the process proceeds to S603, and otherwise, the process is finished.

In S603, it is determined whether the control correction process is performed or not. If the control correction process is performed, the process proceeds to S605, and otherwise, the process proceeds to S604.

In S604, 0 (zero) is substituted into the control correction value α, and the process proceeds to S605.

In S605, the matching position calculator 111 calculates (derives) a matching position P by subtracting the final control value Ctl_FIN input from the computing unit L110 and the control correction value α into Equation (9), and the process is finished.

In the foregoing manner, the matching position can be corrected by computation in accordance with conditions of the lens, thereby providing a lens apparatus that can prevent unintentional lens driving in switching the operation right.

In this embodiment, the instructed position from the operating apparatus is used as the focus instructed position. However, the present invention is not limited to this example, and the instructed position from the operating apparatus may be a zoom instructed position or an iris instructed position. In addition, the driving target of the lens is a focus lens in the above embodiment. However, the present invention is not limited to this example, and the driving target may be a zoom lens or an iris.

In the above embodiment, the control correction process is the integration process. However, the present invention is not limited to this example, and the control correction process only needs to be a process of calculating a final control value by performing the correction process on the input control value inside the lens. In either case of the control correction process, the matching position can be calculated by substituting the control correction value used in the control correction process into Equation (9). Thus, in switching the operation right in which operation of the driving target from the operating unit 202 as an endless operating unit is effective, unintentional lens driving can be prevented.

A case where a constant correction value as described below is used in calculating the final control value will be described. For example, the lens apparatus 100 may have an iris correcting function including an extender that can be inserted and removed in/from an optical path, changes a focal length, and is not illustrated in FIG. 1 and configured to correct an iris (aperture stop) so that the iris (aperture stop) is automatically driven toward an open end by inserting the extender into the optical path. The lens apparatus 100 includes an unillustrated nonvolatile memory that stores a correction value γ of the iris correcting function in accordance with a magnification of the extender. In this case, the instructed position transmitted from the operating apparatus 200 to the lens apparatus 100 is an iris instructed position.

In this case, a matching position can be calculated from Equation (10):

matching position (P)=final control value (Ctl_FIN)−control correction value (α)−correction value (γ)     (10)

As compared to Equation (9), a subtraction process of the correction value γ is added to Equation (10).

Figure 7:
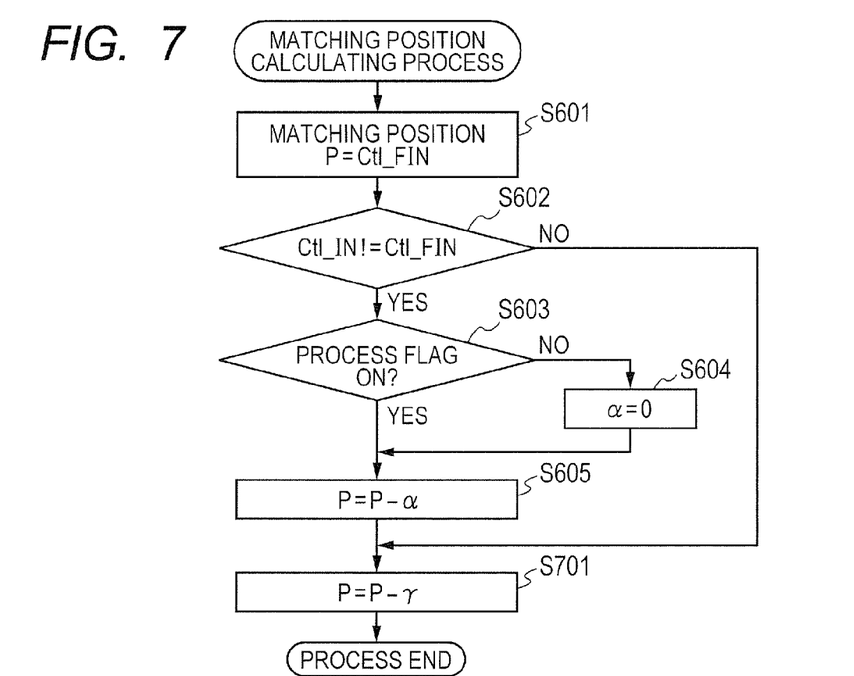
FIG. 7 is a flowchart of the matching position calculating process in the case of using a constant correction value.

FIG. 7 is a flowchart showing a matching position calculating process in calculating a matching position from Equation (10). In the flowchart shown in FIG. 7, steps S601 to S605 shown in FIG. 6 are the same, and S701, which is a subtraction process of a correction value γ described with reference to Equation (10), is added immediately before the process of the flowchart shown in FIG. 6 is finished.

Figure 8A:
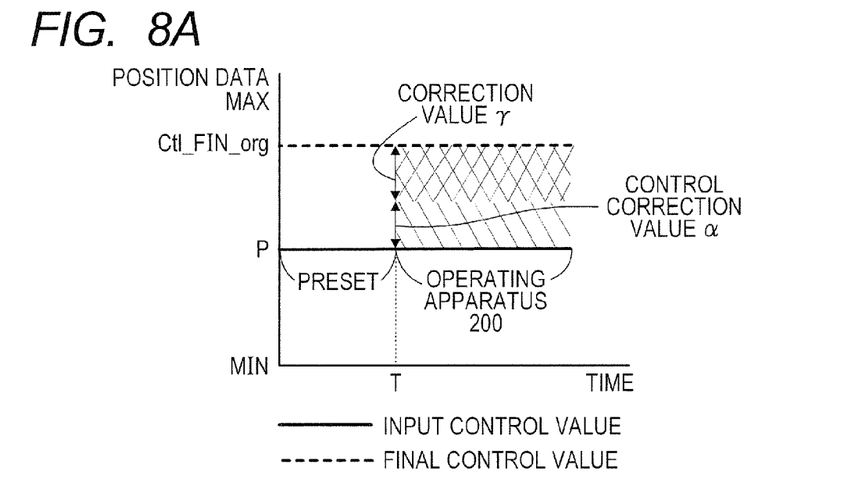
FIG. 8A is a graph showing a relationship among the input control value, the final control value, and the lens position in the case of using a correction value γ.
Figure 8B:
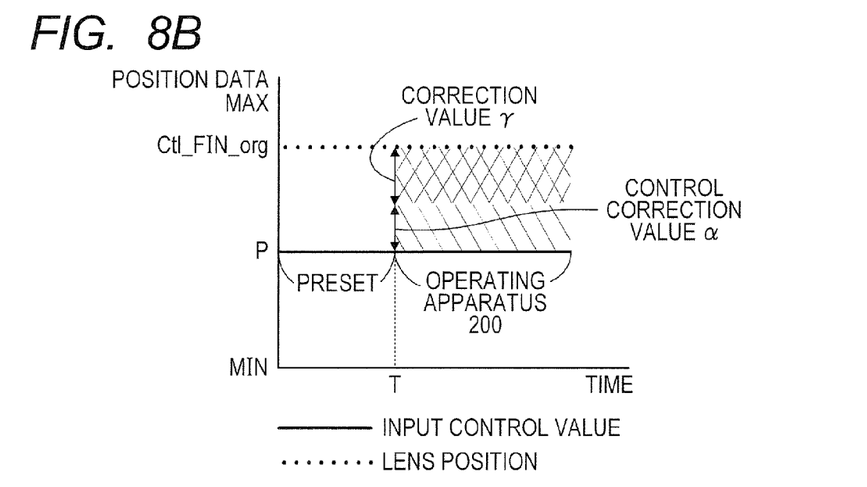
FIG. 8B is a graph showing a relationship among the input control value, the final control value, and the lens position in the case of using the correction value γ.

FIGS. 8A and 8B show relationships among the input control value, the final control value, and the lens position in the case of performing matching at time T in calculating a matching position from Equation (10). Hatched portions in the graphs indicate the control correction value α and double hatched portions in the graphs indicate the correction value γ. In a manner similar to FIGS. 5A and 5B, the final control value in the preset operation is set at Ctl_FIN_org in view of the case where the operation right is switched to the operating apparatus 200 at time T from iris position control by the preset operation.

First, description will be given with reference to FIG. 8A. FIG. 8A illustrates a relationship between the input control value and the final control value. When the operation right is switched from the iris position control by the preset operation to the operating apparatus 200 at time T, matching is executed, and a matching position P is calculated from Equation (10). Then, the input control value from the operating apparatus 200 becomes P by transmitting the calculated matching position P to the operating apparatus 200. That is, after time T, the input control value is P as long as the operating apparatus 200 is not operated. The final control value after time T is P+α+γ obtained by adding the correction value γ and the control correction value α in the integration process to the input control value P, and is equal to Ctl_FIN_org from Equation. (10).

FIG. 8B illustrates a relationship between the input control value and the lens position. As described with reference to FIG. 8A, the final control value after matching is Ctl_FIN_org, and the final control value does not change before and after the execution of the matching. As illustrated in the graph, the lens position does not change, either.

As described above, in the case of using the correction value γ in calculating the final control value from the input control value, the process described with reference to the flowchart of FIG. 7 is performed using Equation (10), thereby preventing unintentional lens driving in switching the operation right.

In the foregoing description, the constant correction value γ has been described using the iris correction value. However, the present invention is not limited to this example, and the correction process only needs to be performed on the input control value. The constant correction value γ may be read out from a nonvolatile memory as described above, or may be a predetermined value or a value that dynamically changes in accordance with conditions of the lens. Furthermore, in the various correction processes, problems described above can be solved by using, as a matching position, a value obtained by subtracting a correction value used in the correction process into Equation (10) from the final control value.

In this embodiment, the matching position can be corrected by computation in accordance with conditions of the lens, thereby providing a lens apparatus that can prevent unintentional lens driving in switching an operation right.

The embodiment described as an example has been directed to an operation of the movable optical member from the endless operating unit of the operating apparatus connected to the lens apparatus through the communicating unit. However, the present invention is not limited to this, and advantages of the present invention can be obtained even by using an endless operating unit included in a lens apparatus body through no communicating units. The use of the lens apparatus according to the present invention, an image pickup element that receives object light from the lens apparatus can provide an image pickup apparatus that can prevent unintentional lens driving in switching an operation right of an endless operating unit.

Although preferred, embodiments of the present invention have been described above, the present invention is not limited to these embodiments, and various changes and modifications can be made within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-257618, filed Dec. 19, 2014, which is hereby incorporated by reference herein in its entirety.

What is claimed is:

1. A lens apparatus comprising:
   a movable optical member;
   a driving unit that drives the movable optical member;
   an operating unit that operates the driving unit;
   a first controller that derives an input value for operating the driving unit based on an operation amount of the operating unit;
   a second controller that corrects the input value input from the first controller to calculate a control value and outputs the control value to the driving unit; and
   a deriving unit that derives a matching position from the control value, wherein
   when an operation from the operating unit becomes effective, the deriving unit outputs the matching position to the first controller, and the first controller sets the matching position to the input value.

2. The lens apparatus of claim 1, wherein
   in a case where there is a difference between the input value and the control value, the deriving unit calculates the matching position using the control value and a correction value.

3. The lens apparatus of claim 1, further comprising:
   a detector that detects a position of the movable optical member, wherein
   the second controller calculates the control value based on a position of the input value and a value obtained by integrating a difference between the input value and the position of the movable optical member.

4. The lens apparatus of claim 1, wherein
the operating unit and the first controller are included in an operating apparatus, and the operating apparatus is connected to the second controller through a communicating unit.

5. The lens apparatus of claim 1, wherein
the movable optical member is a lens that moves along an optical axis.

6. The lens apparatus of claim 1, wherein
the movable optical member is an aperture stop.

7. The lens apparatus of claim 6, further comprising:
an extender that is insertable and removable in or from an optical path and changes a focal length, wherein
the second controller calculates the control value based on the input value and a correction value in accordance with a state of insertion or removal of the extender in or from the optical path.

8. The lens apparatus of claim 1, wherein
the operating unit is endless.

9. An image pickup apparatus comprising:
a lens apparatus comprising:
  a movable optical member;
  a driving unit that drives the movable optical member;
  an operating unit that operates the driving unit;
  a first controller that derives an input value for operating the driving unit based on an operation amount of the operating unit;
  a second controller that corrects the input, value input from the first controller to calculate a control value and outputs the control value to the driving unit; and
  a deriving unit that derives a matching position from the control value, wherein
  when an operation from the operating unit becomes effective, the deriving unit outputs the matching position to the first controller, and the first controller sets the matching position to the input value; and
an image pickup element.

\* \* \* \* \*